United States Patent
Takagi et al.

(10) Patent No.: US 8,646,159 B2
(45) Date of Patent: Feb. 11, 2014

(54) DEVICE AND METHOD FOR ASSEMBLING RETAINER AND COTTER

(75) Inventors: Yoshiaki Takagi, Kitanagoya (JP); Seiji Maeda, Kitanagoya (JP)

(73) Assignee: Sanyo Machine Works, Ltd., Aichi (JP)

( * ) Notice: Subject to any disclaimer, the term of this patent is extended or adjusted under 35 U.S.C. 154(b) by 668 days.

(21) Appl. No.: 12/937,576

(22) PCT Filed: Jan. 14, 2009

(86) PCT No.: PCT/JP2009/050353
§ 371 (c)(1),
(2), (4) Date: Oct. 13, 2010

(87) PCT Pub. No.: WO2010/035511
PCT Pub. Date: Apr. 1, 2010

(65) Prior Publication Data
US 2011/0023277 A1    Feb. 3, 2011

(30) Foreign Application Priority Data
Sep. 25, 2008  (JP) .................................. 2008-246564

(51) Int. Cl.
*B23P 11/00* (2006.01)
(52) U.S. Cl.
USPC .............................................. 29/225; 269/27
(58) Field of Classification Search
USPC ........... 29/225, 255, 270, 278, 252, 238, 237; 269/24, 32, 27
See application file for complete search history.

(56) References Cited

U.S. PATENT DOCUMENTS

| 5,761,785 A * | 6/1998 | Connolly ........................ 29/249 |
| 8,387,222 B2 * | 3/2013 | Chen et al. ................... 29/281.1 |
| 2002/0042979 A1 * | 4/2002 | Ishida et al. ................... 29/237 |
| 2003/0200641 A1 | 10/2003 | Tachibana et al. |
| 2011/0023277 A1 * | 2/2011 | Takagi et al. ................... 29/225 |

FOREIGN PATENT DOCUMENTS

| JP | 62-78225 | 5/1987 |
| JP | 01-257535 | 10/1989 |
| JP | 07-088733 | 4/1995 |
| JP | 08-155763 | 6/1996 |
| JP | 2001-334430 | 12/2001 |
| JP | 2002-285810 | 10/2002 |
| JP | 2003-311557 | 11/2003 |
| JP | 2007-278230 | 10/2007 |

OTHER PUBLICATIONS

International Preliminary Report on Patentability and Written Opinion of the International Searching Authority issued May 19, 2011 in International (PCT) Application No. PCT/JP2009/050353.
International Search Report issued Apr. 21, 2009 in International (PCT) Application No. PCT/JP2009/050353.

* cited by examiner

*Primary Examiner* — Lee D Wilson
(74) *Attorney, Agent, or Firm* — Wenderoth, Lind & Ponack, L.L.P.

(57) ABSTRACT

A large-diameter-side end surface (104*a*) of a cotter (104) can be supported by a cotter holder (32) from below through inserting a shaft member (102) along an inner periphery of the cotter (104) from above the cotter (104). In this state, a protrusion (104*b*) of the cotter (104) and an annular groove (102*a*) of the shaft member (102) are fitted to each other, and the cotter (104) and a retainer (103) are taper-fitted to each other. Consequently, the cotter is prevented from being unstable, and hence it is possible to assemble the retainer (103) and the cotter (104) to the shaft member (102) with good accuracy.

14 Claims, 11 Drawing Sheets

DEVICE AND METHOD FOR ASSEMBLING RETAINER AND COTTER

TECHNICAL FIELD

The present invention relates to a device and a method for assembling a retainer and a cotter to a shaft member.

BACKGROUND ART

A retainer and a cotter serve as a mechanism for mounting a spring in a compressed state along an outer periphery of a shaft member, and are applied to a valve shaft of an engine, etc. (for example, see Patent Literature 1). Specifically, a protrusion formed on an inner peripheral surface of the cotter is engaged with a recess (annular groove) formed in an outer peripheral surface of the shaft member in an axial direction. In this state, an outer peripheral surface of the cotter and an inner peripheral surface of the retainer are taper-fitted to each other, and the spring is locked by the retainer. Consequently, the spring is kept in the compressed state.

When assembling the retainer and the cotter to the shaft member as described above, it is difficult to perform such an operation that the cotter divided into a plurality of pieces is mounted at the outer periphery of the shaft member and the protrusion of the cotter is fitted into the recess of the shaft member. For that reason, various methods have been conventionally proposed for reliably assembling the retainer and the cotter to the shaft member. For example, Patent Literature 2 discloses the following method. Specifically, the shaft member is inserted from below the cotter, and the cotter is pressed from the outer periphery thereof under a state in which correspondence is established between an axial position of the protrusion of the cotter and an axial position of the recess of the shaft member. As a result, the cotter and the shaft member are fitted to each other. At this time, the retainer and a pressing member sandwich the cotter from both sides in the axial direction of the cotter, and hence the cotter is positioned at a predetermined position.

Citation List

Patent Literature 1: JP 2001-334430 A
Patent Literature 2: JP 2003-311557 A

SUMMARY OF INVENTION

Technical Problems

However, in the above-mentioned method of Patent Literature 2, it is necessary to set the cotter free from the sandwiched state when pressing the cotter from the outer periphery thereof, and hence positioning of the cotter is unstable. In particular, when the cotter is moved to a radially inner side to reach an inner hole portion of the retainer, the cotter is likely to be fitted into the inner hole of the retainer. Therefore, it is extremely difficult to accurately position the cotter. If the cotter is positioned inaccurately, the protrusion on the inner peripheral surface of the cotter and the recess in the outer peripheral surface of the shaft member are not satisfactorily fitted to each other. Consequently, there is a risk of an increase in defective products.

In order to solve the above-mentioned problems, it is an object of the present invention to suppress occurrence of defective products through reliably fitting the protrusion of the cotter and the recess of the shaft member to each other when assembling the retainer and the cotter to the shaft member.

Solution to Problems

In order to solve the above-mentioned problems, the present invention provides a retainer-and-cotter assembling device for assembling a shaft member, a cotter, and a retainer together, the shaft member including a recess formed in an outer peripheral surface, the cotter including a protrusion which is formed on an inner peripheral surface and engaged with the recess of the shaft member in an axial direction, the cotter having a tapered outer peripheral surface gradually expanded in diameter to one side in the axial direction, the cotter being divided into a plurality of pieces in a circumferential direction, the retainer having a tapered inner peripheral surface fitted onto the tapered outer peripheral surface of the cotter. The retainer-and-cotter assembling device includes: a cotter holder for supporting a large-diameter-side end surface of the cotter from below; first moving means for inserting the shaft member along an inner periphery of the cotter from above the cotter; a cotter pressing mechanism for pressing the cotter from an outer periphery of the cotter and for fitting the protrusion on the inner peripheral surface of the cotter into the recess in the outer peripheral surface of the shaft member; and second moving means for taper-fitting the inner peripheral surface of the retainer onto the outer peripheral surface of the cotter from above the cotter.

As described above, according to the retainer-and-cotter assembling device of the present invention, the shaft member is inserted along the inner periphery of the cotter from above the cotter. Thus, the large-diameter-side end surface of the cotter (among both end surfaces in the axial direction of the cotter, end surface having an outer periphery with a larger diameter) can be supported by the cotter holder from below. According to the device, while the large-diameter-side end surface of the cotter is supported, the protrusion on the inner periphery of the cotter and the recess in the outer periphery of the shaft member can be fitted to each other, and the cotter and the retainer can be taper-fitted to each other. Therefore, the cotter is prevented from being unstable, and hence it is possible to perform the assembly reliably. In other words, while the large-diameter-side end surface of the cotter is supported from below, the shaft member is inserted along the inner periphery of the cotter from above, and correspondence is established between an axial position of the recess formed in the outer peripheral surface of the shaft member and an axial position of the protrusion formed on the inner peripheral surface of the cotter. In this state, the recess of the shaft member and the protrusion of the cotter are fitted to each other through pressing the cotter from the outer periphery thereof, and the tapered inner peripheral surface of the retainer is fitted onto the tapered outer peripheral surface of the cotter from above. As a result, it is possible to reliably assemble the retainer and the cotter to the shaft member.

The cotter pressing mechanism includes, for example, a pair of sandwiching members for sandwiching the cotter, and an opening/closing member provided with a cam surface for opening/closing the sandwiching members. In the cotter pressing mechanism, the opening/closing member is moved relative to the sandwiching members so that the sandwiching members are allowed to be opened/closed. At this time, when the opening/closing member is moved by the second moving means for moving the retainer relatively, relative movement of the retainer and relative movement of the opening/closing member can be realized by one moving means (drive source).

When the guide pin is inserted along the inner periphery of the cotter, the cotter can be supported also from the inner periphery thereof, and hence it is possible to further stabilize the positioning of the cotter. In a case where the cotter can be moved downward by a pressing force applied by the shaft member from above, when the shaft member is inserted along the inner periphery of the cotter and the guide pin is pushed down, the cotter can be always supported from the inner periphery side thereof by the guide pin or the shaft member during a step of assembling the retainer and the cotter.

By the way, in a case where the shaft member is inserted from below the cotter as in the conventional method, it has been necessary to arrange a spring and a spring sheet on a workpiece side, the spring and the spring sheet being mounted between the retainer and the workpiece (cylinder head, for example). Therefore, at least two steps have been required, that is, a step of setting the spring and the spring sheet onto the workpiece and a step of mounting the retainer and the cotter onto the workpiece. According to the present invention, the assembling device and the workpiece are arranged inversely to the conventional method, and hence the shaft member is inserted from above the cotter. As a result, it is possible to place the spring and the spring sheet on the assembling device side in advance. That is, under a state in which the spring and the spring sheet are held together with the retainer, the retainer and the cotter are assembled to the shaft member, and hence there is no need to separately provide a step of placing the spring and the spring sheet onto the workpiece. Thus, improvement of work efficiency is achieved.

Advantageous Effects of Invention

As described above, according to the retainer-and-cotter assembling device and the retainer-and-cotter assembling method of the present invention, it is possible to reliably fit the protrusion of the cotter and the recess of the shaft member to each other, and to suppress occurrence of defective products.

DESCRIPTION OF EMBODIMENT

Hereinafter, an embodiment of the present invention is described with reference to the drawings.

Figure 1:
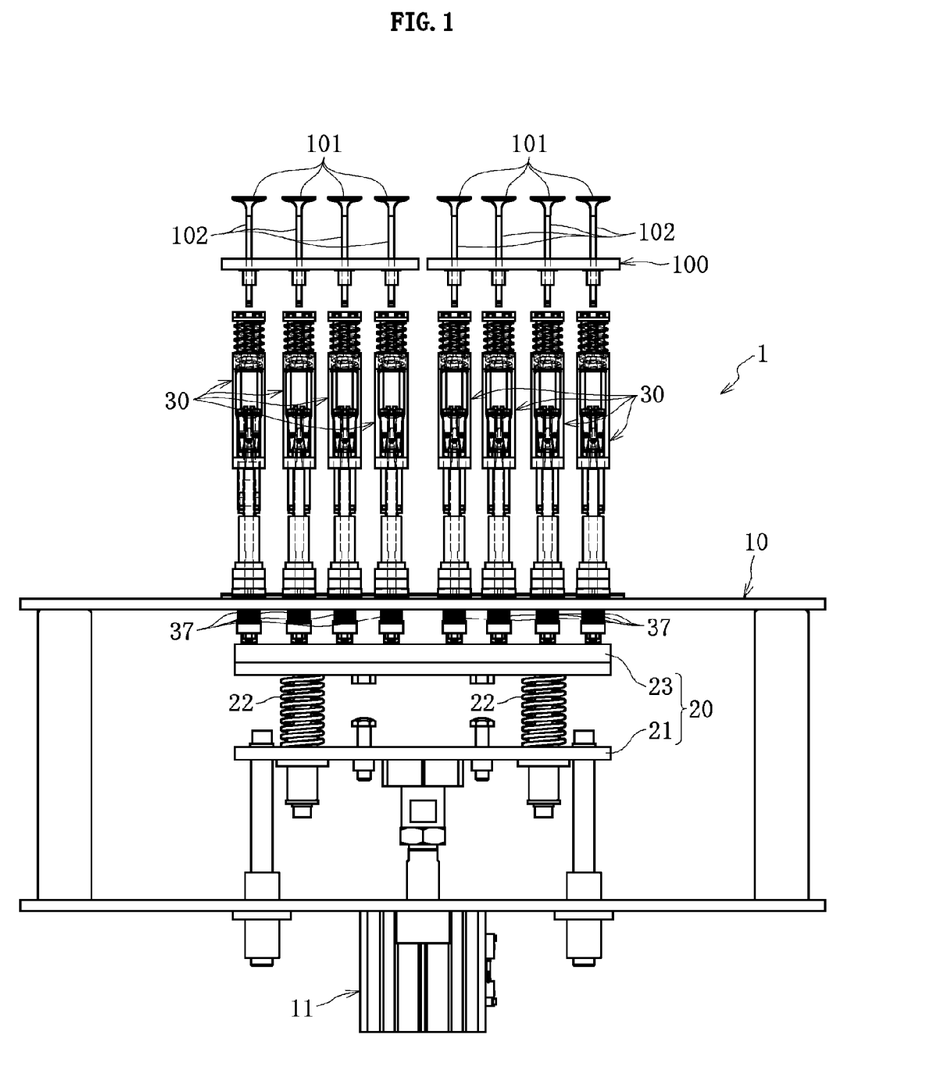
[FIG. 1] A front view of an assembling device (in a state before assembly).
Figure 2:
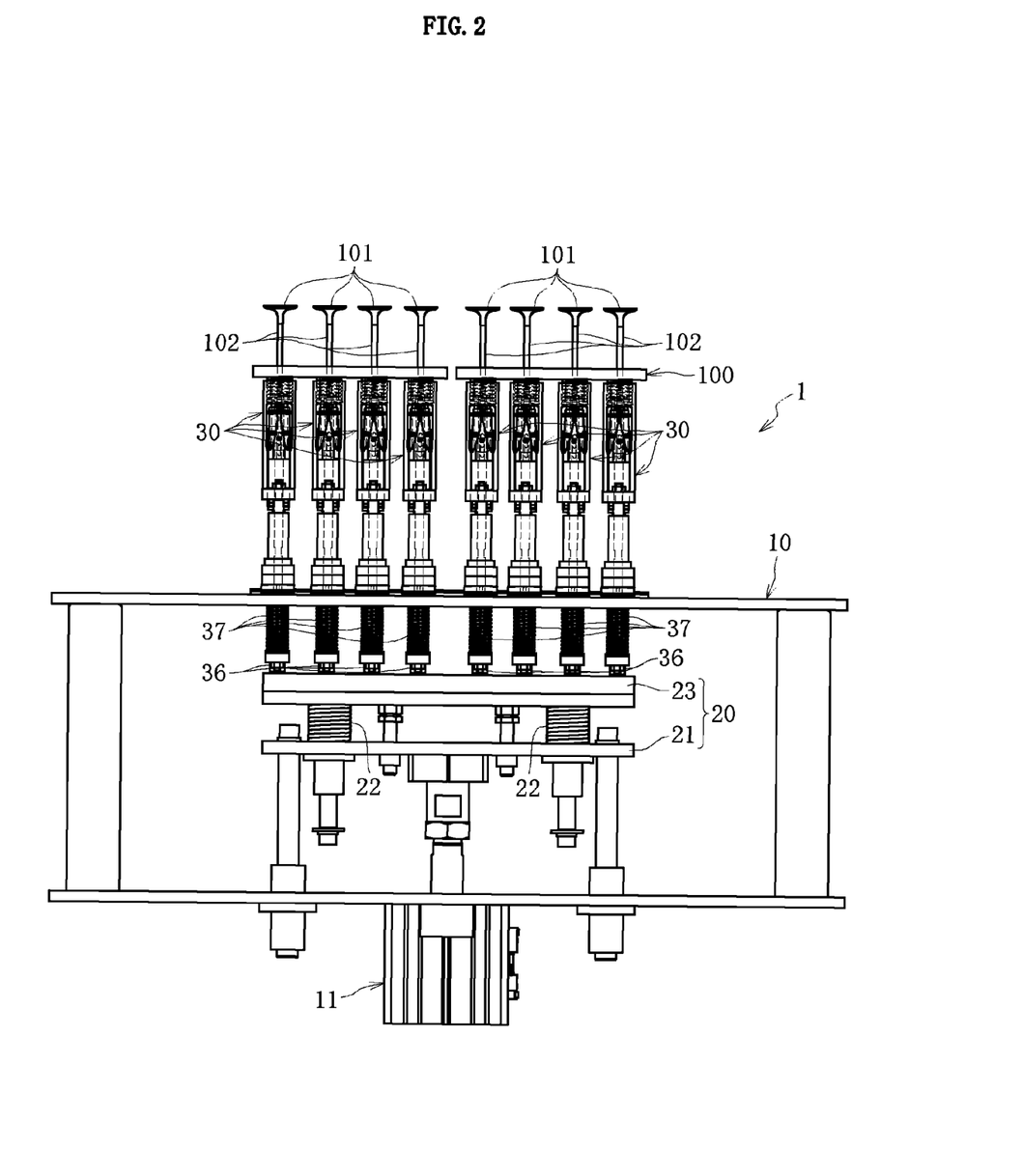
[FIG. 2] A front view of the assembling device (in a state in which workpieces are lowered).
Figure 3:
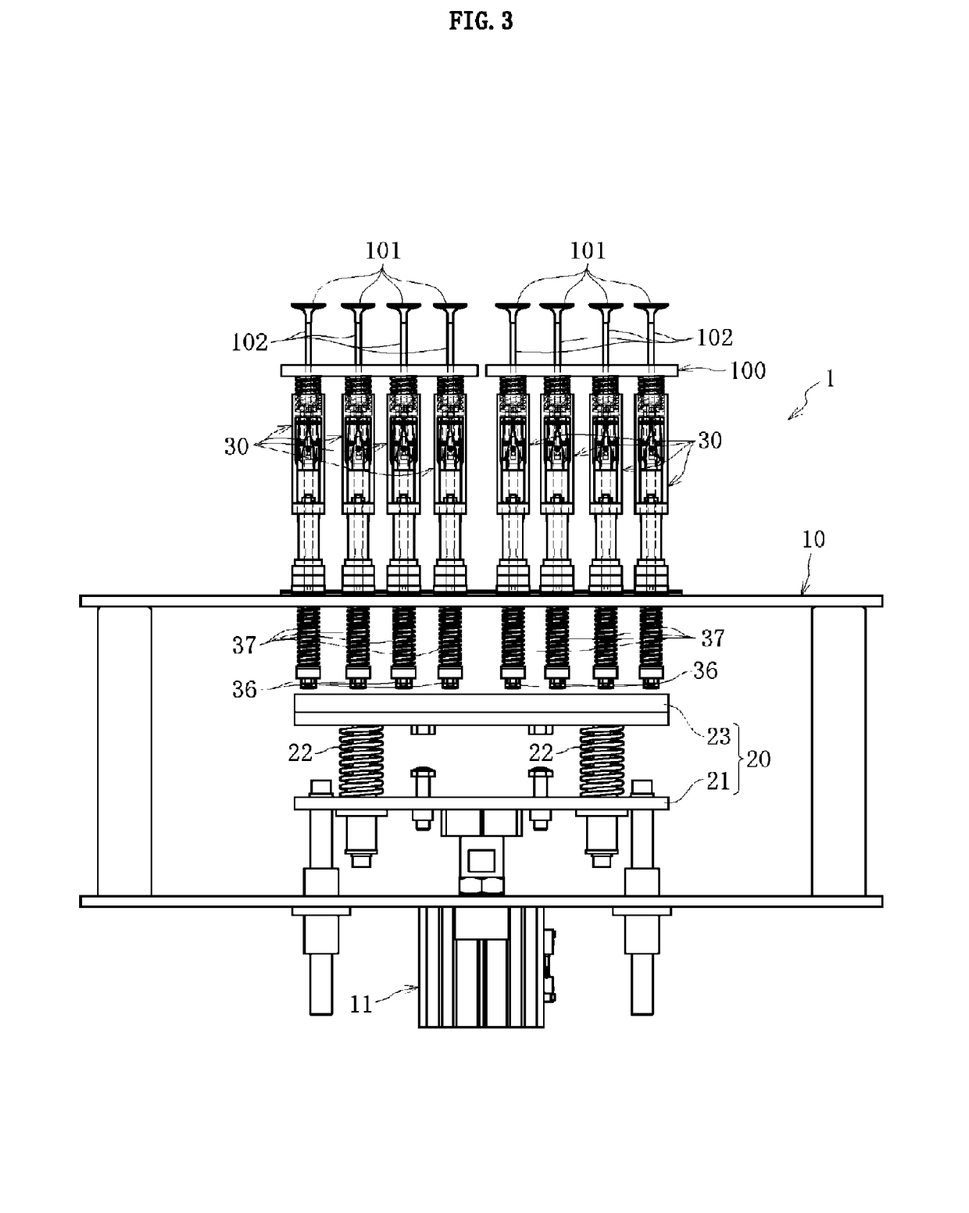
[FIG. 3] A front view of the assembling device (in a state of the completion of assembly).
Figure 4:
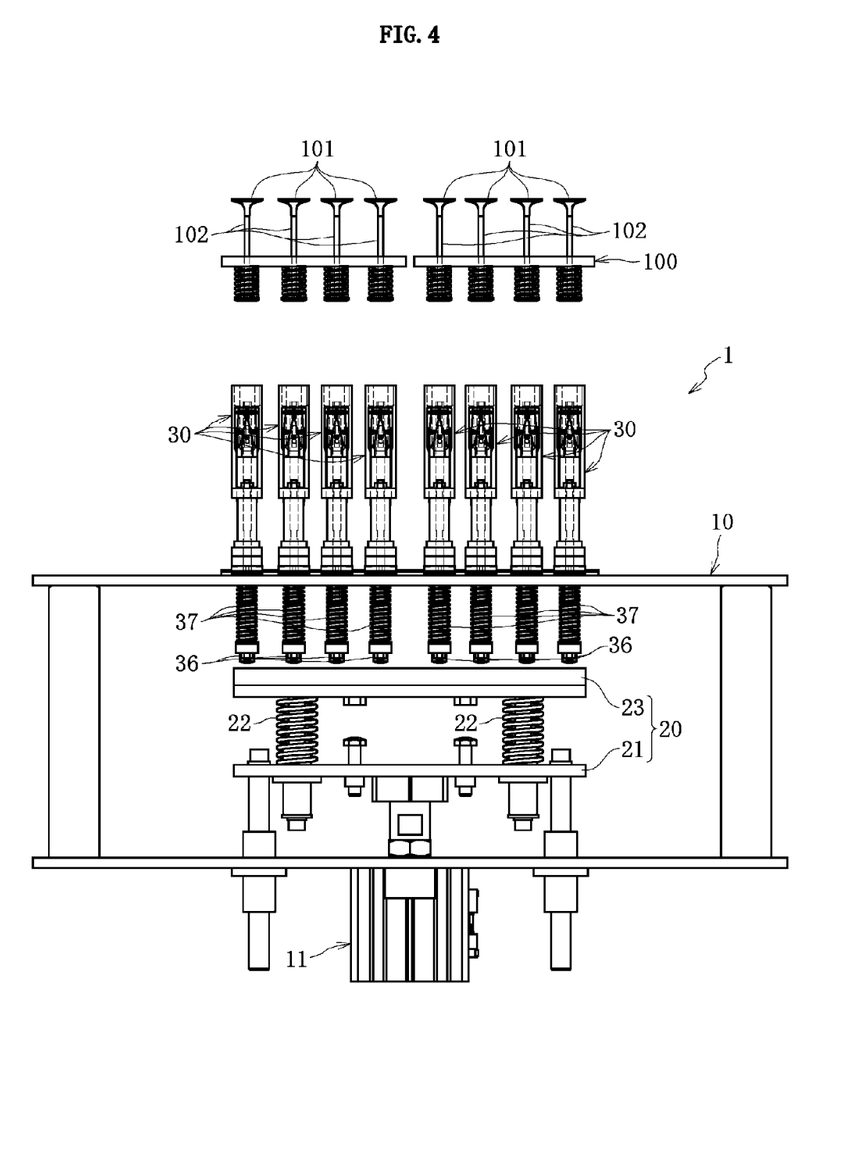
[FIG. 4] A front view of the assembling device (in a state in which the workpieces are detached from the device).

FIGS. 1 to 4 illustrate a retainer-and-cotter assembling device 1 (hereinafter, simply referred to as assembling device 1) according to the embodiment of the present invention. The assembling device 1 assembles a retainer and cotters to, for example, each of valve stems 102 of valves 101 (eight in total) provided to four cylinders on one side of cylinder heads 100 (partially illustrated) of an eight-cylinder engine. FIG. 1 illustrates a state before start of assembly, FIG. 2 illustrates a state during assembly, FIG. 3 illustrates a state after completion of assembly, and FIG. 4 illustrates a state in which workpieces are detached from the assembling device 1 after the completion of assembly.

As illustrated in FIG. 1, the assembling device 1 mainly includes a stationary frame 10, a movable bench 20 provided to be capable of lifting up and down relative to the stationary frame 10, assembling sections 30 each for assembling a retainer and cotters to each of the valves 101, and first moving means (not shown) for lifting the workpieces (cylinder heads 100 and valves 101) up and down.

On the stationary frame 10, there is provided a drive cylinder 11 serving as second moving means for lifting the movable bench 20 up and down. The movable bench 20 includes a first movable bench 21 coupled to the drive cylinder 11, and a second movable bench 23 which is attached to the first movable bench 21 through first springs 22 and is movable up and down relative to the first movable bench 21. The second movable bench 23 is arranged below the assembling sections 30, and is capable of bringing an upper surface of the second movable bench 23 into contact with lower end portions of the assembling sections 30 (see FIGS. 1 and 2) or away from the lower end portions of the assembling sections 30 (see FIGS. 3 and 4) due to upward and downward lift of the drive cylinder 11.

The assembling sections 30 are fixed on the stationary frame 10 so that an axial direction of each assembling section is along a vertical direction. In the illustrated example, in order to assemble retainers and cotters to the eight valve stems 102 simultaneously, the eight assembling sections 30 are arranged in line with intervals corresponding to intervals between the valve stems 102.

Figure 5:
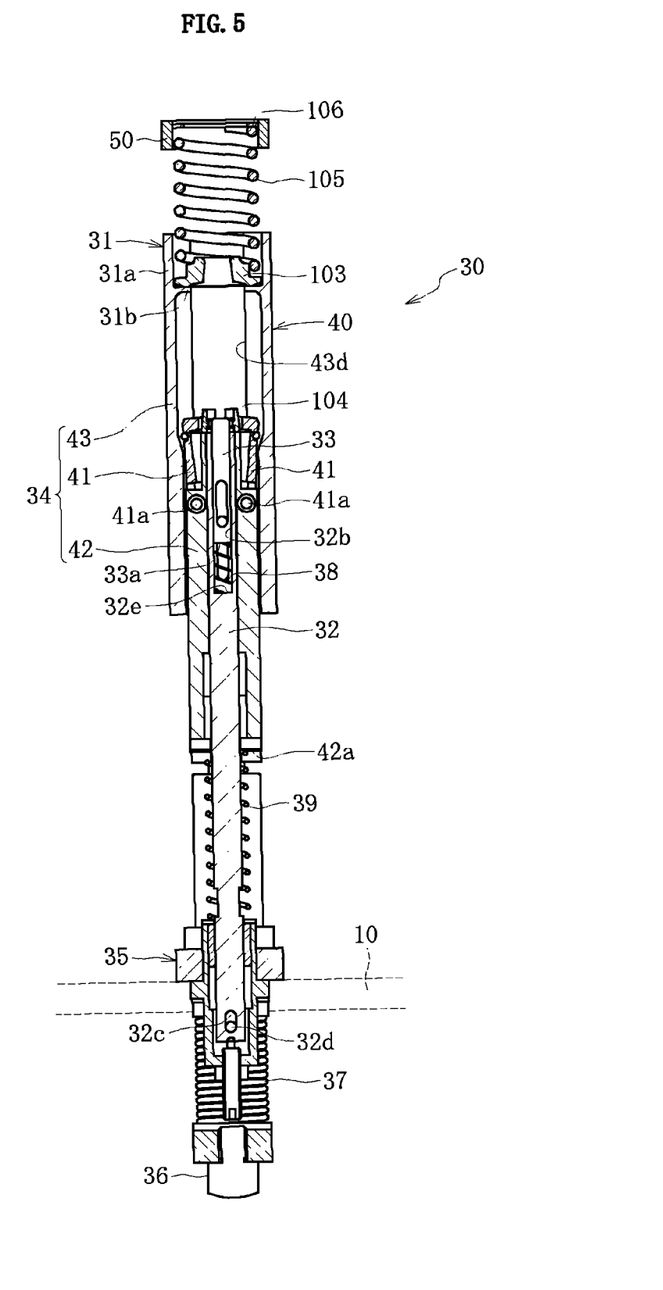
[FIG. 5] A sectional view of an assembling section.

One of the assembling sections 30 is described in detail with reference to FIG. 5. FIG. 5 illustrates a state before start of assembly (see FIG. 1). A retainer 103, cotters 104, and a valve spring 105 are mounted to the assembling section 30. The assembling section 30 mainly includes: a retainer holder 31 for holding the retainer 103 at an inner periphery thereof;

a cotter holder 32 for supporting the cotters 104 below the retainer 103 from below; a guide pin 33 inserted along inner peripheries of the cotters 104; a cotter pressing mechanism 34 for pressing the cotters 104 in a horizontal direction from outer peripheries of the cotters 104; a fixing portion 35 to be fixed to the stationary frame 10; and an abutting portion 36 abutting against the upper surface of the second movable bench 23 of the movable bench 20.

The retainer holder 31 includes a cylindrical portion 31a and a locking portion 31b. The cylindrical portion 31a receives the retainer 103 and the valve spring 105 at an inner periphery thereof. The locking portion 31b protrudes radially inward from an inner peripheral surface of the cylindrical portion 31a, and supports the retainer 103 from below. The valve spring 105 is placed above the retainer 103 supported by the locking portion 31b from below. An inner diameter of the cylindrical portion 31a is set to be slightly larger than an outer diameter of the retainer 103 and an outer diameter of the valve spring 105. With this setting, the retainer 103 and the valve spring 105 are roughly positioned. In the illustrated example, the retainer holder 31 is formed integrally with a tubular opening/closing member 43 described later, which constitutes the cotter pressing mechanism 34 (thus integrated members are referred to as lifting sleeve 40). The cylindrical portion 31a of the retainer holder 31 and the opening/closing member 43 are formed into cylindrical shapes with the same diameter and the same thickness. The lifting sleeve 40 is coupled to the abutting portion 36 (not shown), and the lifting sleeve 40 and the abutting portion 36 are integrally lifted up and down. A second spring 37 is arranged between the fixing portion 35 and the abutting portion 36 in a compressed state. With this structure, the abutting portion 36 and the lifting sleeve 40 are always biased downward.

Figure 6:
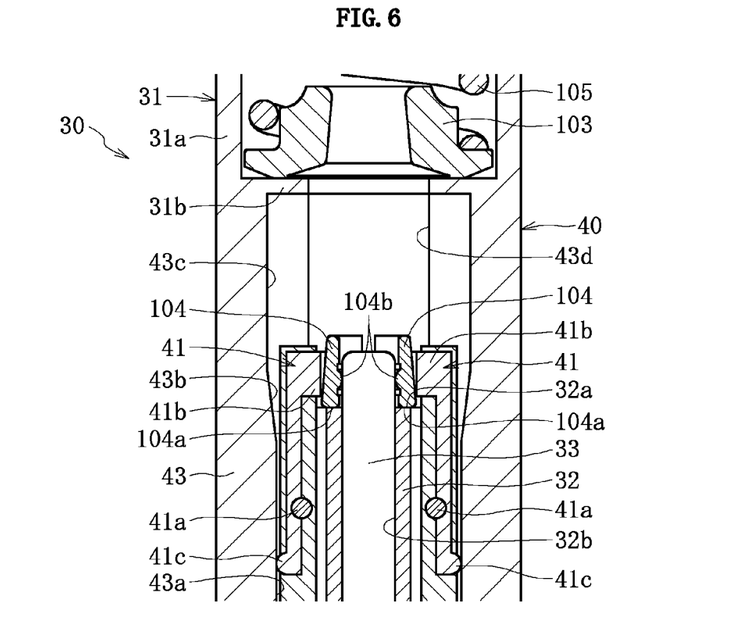
[FIG. 6] A sectional view illustrating an assembling method (before assembly).

The cotter holder 32 is arranged below the retainer holder 31, and is arranged to be coaxial with the retainer holder 31. As illustrated in FIG. 6 in an enlarged manner, an inner hole 32b through which the guide pin 33 is inserted is formed in an upper end surface 32a of the cotter holder 32, and large-diameter-side end surfaces 104a of the cotters 104 are placed on the annular upper end surface 32a. A guide hole 32c is formed in a lower end portion of the cotter holder 32. Through inserting a pin 32d into the guide hole 32c, the cotter holder 32 is fixed to the fixing portion 35. The guide hole 32c has an elongated shape, and the pin 32d is slidable up and down in the guide hole 32c. Thus, upward and downward movement of the cotter holder 32 is allowed by an amount corresponding to the size of the guide hole 32c.

The guide pin 33 is inserted into the inner hole 32b of the upper end surface 32a of the cotter holder 32, and is arranged while protruding upward from the upper end surface 32a. The guide pin 33 protruding from the upper end surface 32a is inserted along the inner peripheries of the cotters 104, to thereby support the cotters 104 from a radially inner side. A third spring 38 is arranged between a lower end portion 33a of the guide pin 33 and a bottom 32e of the inner hole 32b of the cotter holder 32. When the guide pin 33 is pressed from above, the guide pin 33 is biased upward by a repulsive force of the third spring 38.

The cotter pressing mechanism 34 includes: a pair of sandwiching levers 41 (sandwiching members) for pressing a pair of cotters 104 radially inward from the outer peripheries of the cotters; a lever support portion 42 for supporting the sandwiching levers pivotally and swingably; and the opening/closing member 43 having a cam surface for opening/closing the sandwiching levers 41.

Each of the sandwiching levers 41 is provided to be able to swing about a pivot 41a that is pivotally supported by the lever support portion 42. As illustrated in FIG. 6, of each of the sandwiching levers 41, a one-side end portion with respect to the pivot 41a (upper end portion in the illustrated example) is provided with a cotter sandwiching portion 41b protruding radially inward, and the other-side end portion with respect to the pivot 41a (lower end portion in the illustrated example) is provided with a cam follower 41c protruding radially outward. The pair of sandwiching levers 41 are provided symmetrically with respect to an axial direction, and the cotter sandwiching portions 41b are opposed to each other in the horizontal direction. The pair of sandwiching levers 41 include biasing means (for example, spring) (not shown) for always biasing the cotter sandwiching portions 41b in a direction in which the cotter sandwiching portions 41b become closer to each other (in a direction in which the levers are closed).

The lever support portion 42 has a substantially cylindrical shape, and is provided to be slidable in the axial direction with respect to the cotter holder 32, the cotter holder 32 being inserted along an inner periphery of the lever support portion 42. A fourth spring 39 is arranged between a lower end portion 42a of the lever support portion 42 and the fixing portion 35. When the lever support portion 42 is pressed from above, the lever support portion 42 is biased upward by a repulsive force of the fourth spring 39.

The opening/closing member 43 has a substantially cylindrical shape, and receives the sandwiching levers 41 and the lever support portion 42 at the inner periphery thereof. The cam surface for opening/closing the sandwiching levers 41 is provided to the inner peripheral surface of the opening/closing member 43. In the illustrated example, there are formed a small-diameter cylindrical surface 43a fitted onto the outer peripheral surface of the lever support portion 42, a tapered surface 43b gradually expanded in diameter upward from an upper end of the small-diameter cylindrical surface 43a, and a large-diameter cylindrical surface 43c extending upward from an upper end of the tapered surface 43b. The small-diameter cylindrical surface 43a and the tapered surface 43b function as the cam surface. Under a state illustrated in FIGS. 5 and 6, the cam followers 41c of the sandwiching levers 41 are held in contact with the small-diameter cylindrical surface 43a of the opening/closing member 43, to thereby keep the cotter sandwiching portions 41b of the pair of sandwiching levers 41 open. When the opening/closing member 43 is lowered relative to the lever support portion 42 and the cam followers 41c of the sandwiching levers 41 reach the tapered surface 43b, the cam followers 41c are gradually opened radially outward, and the cotter sandwiching portions 41b are closed. A window 43d is provided over a front side and a back side of the opening/closing member 43. The cotters can be arranged at the inner periphery of the opening/closing member 43 from the outside through the window 43d.

Next, with reference to FIGS. 6 to 17, a retainer-and-cotter assembling method using the assembling device 1 having the above-mentioned structure is described in detail.

First, as illustrated in FIG. 6, the retainer 103, the cotters 104, and the valve spring 105 are placed onto the assembling section 30 of the assembling device 1. The retainer 103 is placed on an upper surface of the locking portion 31b of the retainer holder 31, and the valve spring 105 is placed on the retainer 103. In the present invention, as illustrated in FIG. 1, a structure of lowering workpieces (cylinder heads 100 and valves 101) relatively from above the cotters 104 is adopted. In a case of a structure of lifting up the workpieces from below the cotters as in a conventional method, the valve spring is arranged below the retainer, and hence the valve spring needs to be placed on the workpiece side. However, through lowering the workpieces from above the cotters 104 as described above, the valve spring 105 can be arranged on the assembling device 1 side (retainer holder 31) in advance. Thus, it is possible to eliminate a step of mounting the valve spring 105 on the workpiece side (cylinder head 100), which is required in the conventional method, and hence improvement of work efficiency is achieved. In this embodiment, as illustrated in FIG. 5, a spring sheet 106 is further placed on the valve spring 105. Consequently, mounting of the spring sheet 106 can be performed simultaneously with mounting of the valve spring 105. The spring sheet 106 has an annular shape (hollow disk shape), and is mounted between the valve spring 105 and the cylinder head 100. A cylindrical guide member 50 is fixed to an outer periphery of the spring sheet 106. The guide member 50 is provided to be capable of lifting up and down relative to the assembling section 30 by a sliding mechanism (not shown), and holds the spring sheet 106 in a horizontal state.

FIG. 5 illustrates a general view of the assembling section 30 in the state illustrated in FIG. 6. At this time, the lifting sleeve 40 is arranged at the uppermost position relative to the fixing portion 35 (stationary frame 10), and the window 43d provided in the lifting sleeve 40 (opening/closing member 43) is largely open above the cotter holder 32. With this structure, the cotters 104 can be easily placed on the upper end surface 32a of the cotter holder 32 from the outside through the window 43d. As illustrated in FIG. 6, the cotters 104 divided into a plurality of pieces (two in the illustrated example) are placed on the upper surface of the cotter holder 32 so that the large-diameter-side end surfaces 104a point downward. At this time, the guide pin 33 is inserted along the inner peripheries of the cotters 104 to be brought into contact with annular protrusions 104b which are respectively formed on the inner peripheral surfaces of the cotters 104. As a result, the cotters 104 are supported from the radially inner side. Further, the cotters 104 are supported from a radially outer side by the cotter sandwiching portions 41b of the pair of sandwiching levers 41. In this way, the cotters 104 are supported by the cotter holder 32, the guide pin 33, and the sandwiching levers 41, and hence it is possible to hold the cotters 104 in a stable state.

FIG. 1 illustrates a general view of the assembling device 1 in the state illustrated in FIG. 6. In this state, the drive cylinder 11 is stopped in the most extended state. An elastic modulus $K_1$ of all of the plurality of (two in the illustrated example) first springs 22 provided between the first movable bench 21 and the second movable bench 23 is set to be larger enough than an elastic modulus $K_2$ of all of the plurality of (eight in the illustrated example) second springs 37 each provided between the abutting portion 36 at a lower end of the assembling section 30 and the fixing portion 35 (stationary frame 10) ($K_1 >> K_2$). With this setting, in the state illustrated in FIG. 1, that is, in the state before the workpieces are lowered, the second springs 37 are compressed by elastic repulsive forces of the first springs 22, and hence the second springs 37 are compressed more than the first springs 22.

Figure 7:
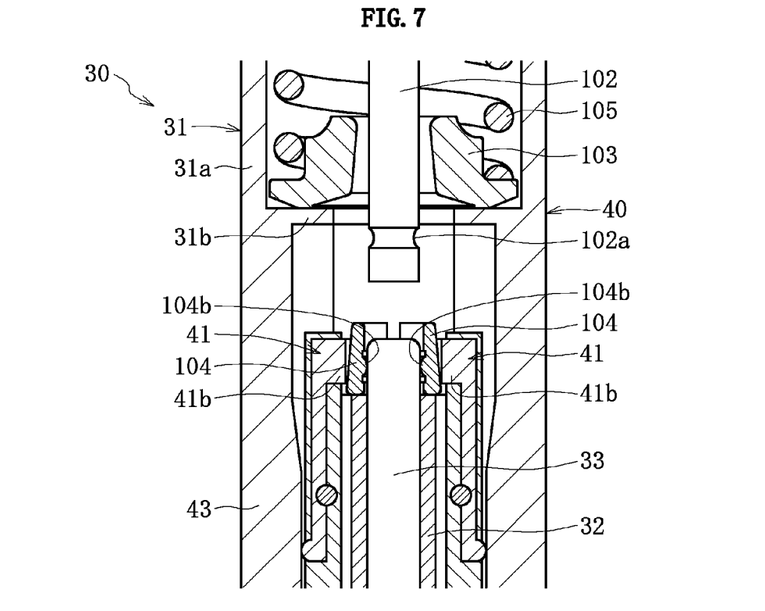
[FIG. 7] A sectional view illustrating the assembling method (at the start of spring compression).

The cylinder heads 100 are lowered by the first moving means (not shown) from the above-mentioned state, and then, the valve stems 102 of the valves 101 mounted to the cylinder heads 100 are respectively inserted along the inner peripheries of the assembling sections 30 from above (see FIG. 7). Along with the lowering of the cylinder heads 100, each of the valve springs 105 is compressed between the retainer 103 and the cylinder head 100. Simultaneously, the lifting sleeve 40 and the abutting portion 36 are pushed down through the valve spring 105, and the abutting portion pushes the second movable bench 23 down. Consequently, the first springs 22 are compressed, and the second springs 37 are extended (see FIG. 2). At this time, the cotter holder 32, the guide pin 33, the sandwiching levers 41, and the lever support portion 42 are stationary.

Figure 8:
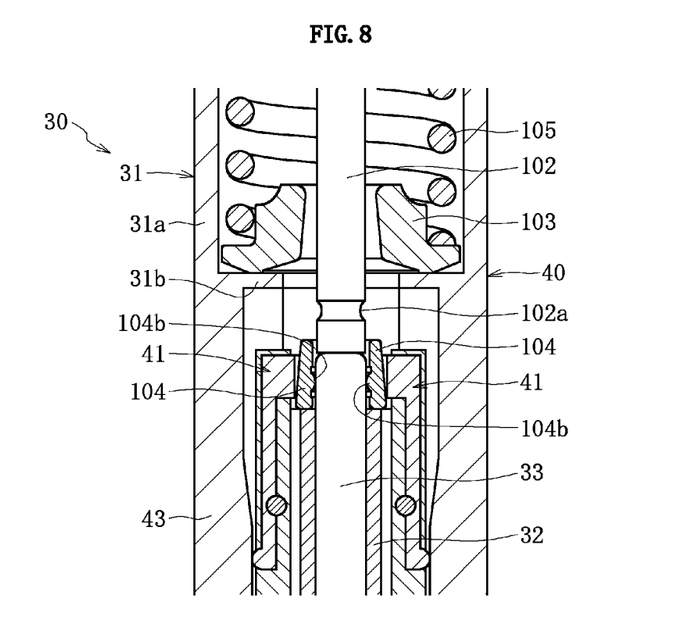
[FIG. 8] A sectional view illustrating the assembling method (when a valve stem is brought into contact with a guide pin).

The cylinder heads 100 and the valves 101 are further lowered, and then, the lower end portion of each of the valve stems 102 is brought into contact with the upper end portion of the guide pin 33 (see FIG. 8). The cylinder heads 100 and the valves 101 are still further lowered from the above-mentioned state, and then, each of the valve stems 102 is lowered while each of the valve stems 102 pushes the guide pin 33 down against the second spring 37 that biases the guide pin 33 upward.

Figure 9:
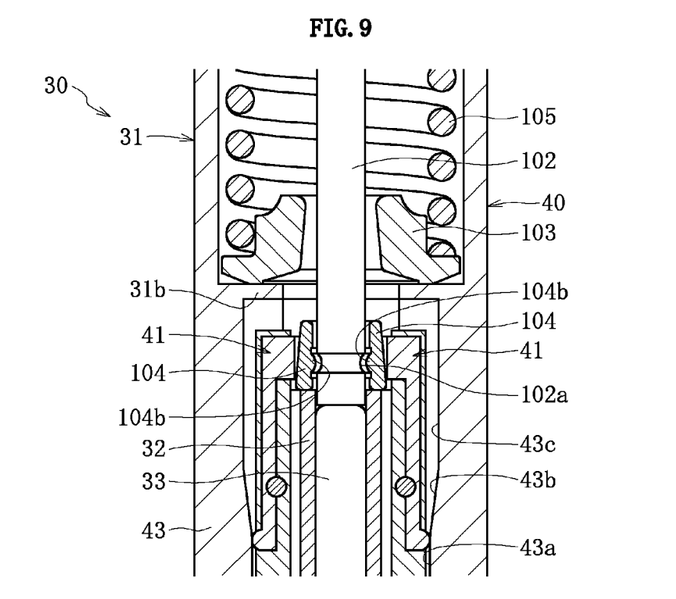
[FIG. 9] A sectional view illustrating the assembling method (in a state in which correspondence is established between an axial position of a recess of the valve stem and axial positions of protrusions of cotters).
Figure 10:
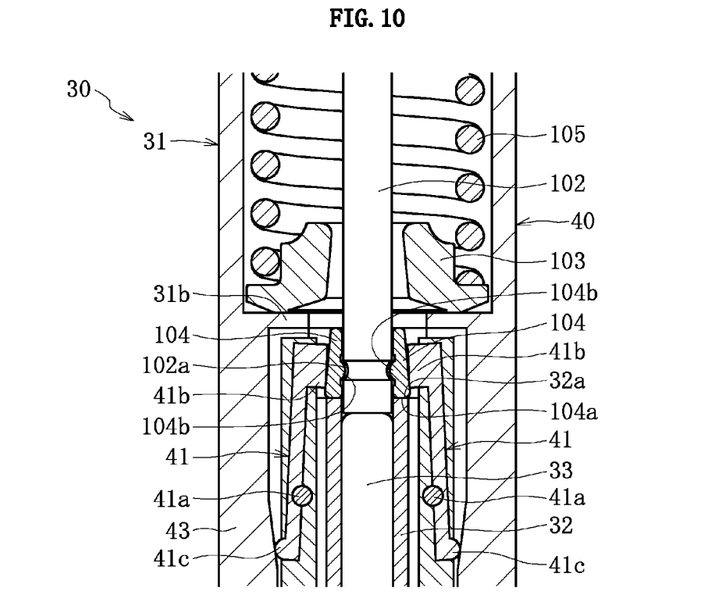
[FIG. 10] A sectional view illustrating the assembling method (in a state in which the protrusions of the cotters are fitted into the recess of the valve stem).
Figure 11:
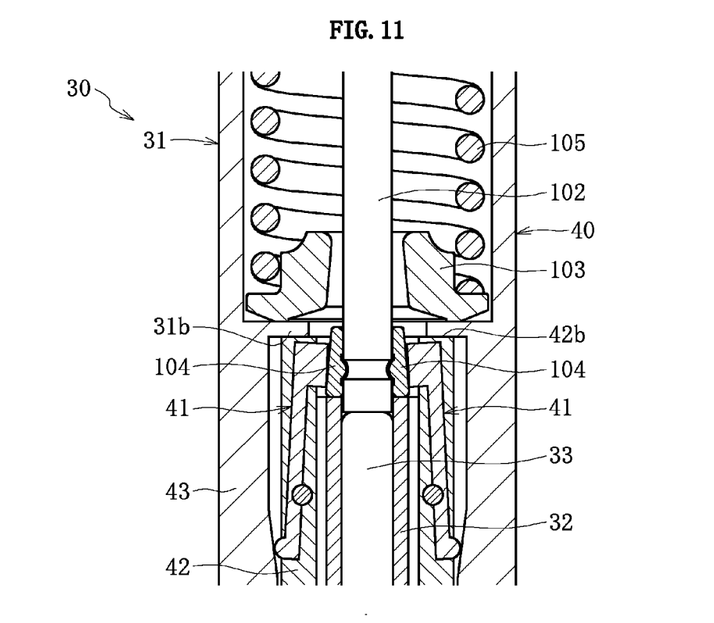
[FIG. 11] A sectional view illustrating the assembling method (when a retainer holder and a lever support portion are brought into contact with each other).
Figure 12:
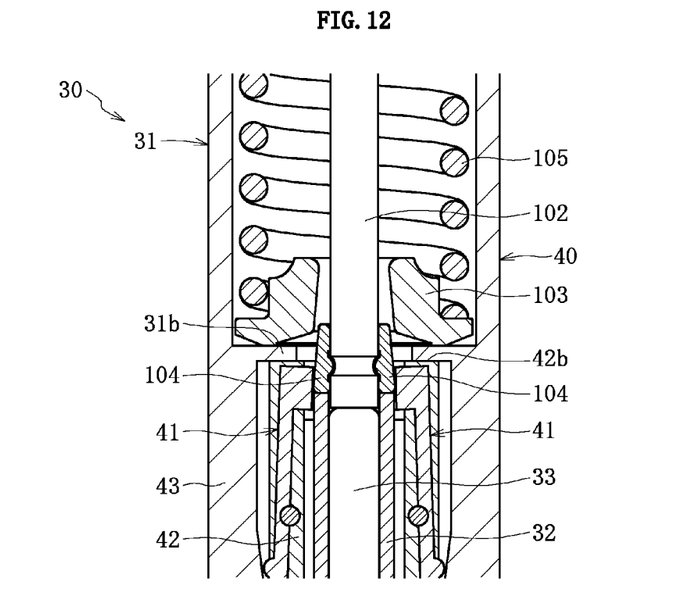
[FIG. 12] A sectional view illustrating the assembling method (when the lever support portion is lowered).
Figure 13:
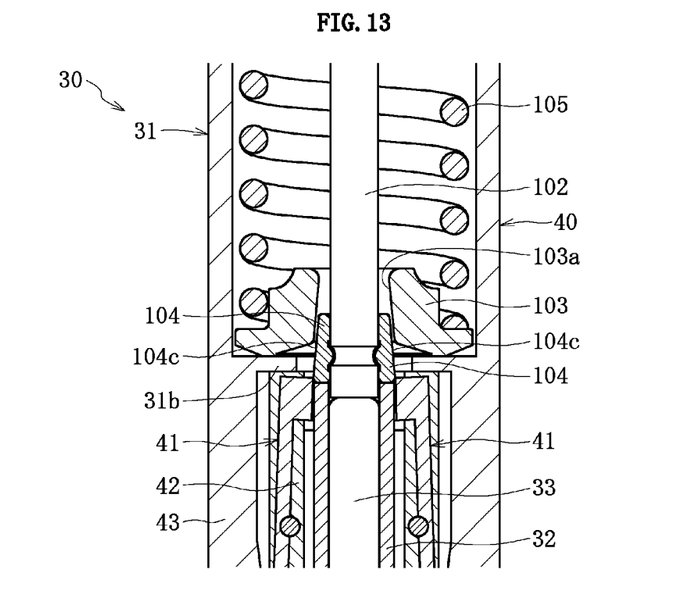
[FIG. 13] A sectional view illustrating the assembling method (when a retainer and the cotters start to be fitted to each other).

As illustrated in FIG. 9, when an annular groove 102a as a recess formed in the outer peripheral surface of each of the valve stems 102 and the protrusions 104b respectively formed on the inner peripheral surfaces of the cotters 104 reach the same axial position, the lowering of the cylinder heads 100 and the valves 101 by the first moving means is stopped (state illustrated in FIG. 2). Then, the drive cylinder 11 is retracted, and the first movable bench 21 is lowered. With this, the first springs 22 are extended so that their repulsive forces are reduced, and hence the second springs 37 are extended so that the second movable bench 23 is lowered (see FIG. 3). Along with the lowering of the second movable bench 23, the abutting portion 36 of each of the assembling sections 30 is pushed downward by a biasing force of each of the second springs 37. Consequently, the lifting sleeve 40 (opening/closing member 43) coupled to the abutting portion 36 is lowered relative to members (sandwiching levers 41, lever support portion 42, cotter holder 32, and guide pin 33), which hold the cotters 104. That is, the lowering of the lifting sleeve 40 before the state of FIG. 9 is performed in such a manner that the locking portion 31b is pushed down through the spring 105 along with the lowering of the workpieces (cylinder heads 100). Meanwhile, the lowering of the lifting sleeve 40 after the state of FIG. 9 is performed in such a manner that the abutting portion 36 is pushed down by the repulsive force of each of the second springs 37 along with the lowering of the second movable bench 23 under a state in which the workpieces are stopped.

When the lifting sleeve 40 is lowered relative to the sandwiching levers 41 and the cam followers 41c of the sandwiching levers 41 reach the tapered surface 43b of the inner peripheral surface of the opening/closing member 43 (see FIG. 10), the cam followers 41c of the sandwiching levers 41 are opened, and the cotter sandwiching portions 41b are closed. Thus, the cotter sandwiching portions 41b press the cotters 104 radially inward from the outer peripheries of the cotters 104 so that the protrusions 104b of the cotters 104 are fitted into the annular groove 102a of the valve stem 102. At this time, the valve stem 102 is stopped, and hence the annular groove 102a of the valve stem 102 and the protrusions 104b of the cotters 104 can be reliably fitted to each other while correspondence is established between an axial position of the annular groove 102a of the valve stem 102 and axial positions of the protrusions 104b of the cotters 104. Further, when the cotters 104 are moved radially inward, the large-diameter-side end surfaces 104a (lower end surfaces) of the cotters 104 are always supported by the cotter holder 32 from below, and hence the cotters 104 are prevented from being unstable. Thus, it is possible to reliably fit the protrusions 104b into the annular groove 102a.

After that, the drive cylinder 11 is further retracted, and the lifting sleeve 40 is lowered. Consequently, the lower end surface of the locking portion 31b of the lifting sleeve 40 is brought into contact with an upper end portion 42b of the lever support portion 42 (see FIG. 11). When the lifting sleeve 40 is further lowered in this state, the locking portion 31b pushes the lever support portion 42 down (see FIG. 12). When the lifting sleeve 40 is still further lowered, tapered outer peripheral surfaces 104c of the cotters 104 and a tapered inner peripheral surface 103a of the retainer 103 held by the retainer holder 31 start to be fitted to each other (see FIG. 13). At this time, the sandwiching levers 41 are lowered. As a result, the cotters 104 are set free from support of the outer peripheries by the sandwiching levers 41, whereas the cotters 104 are supported from the outer peripheries by the retainer 103 instead. Thus, it is possible to keep the stable supported state of the cotters 104.

Figure 14:
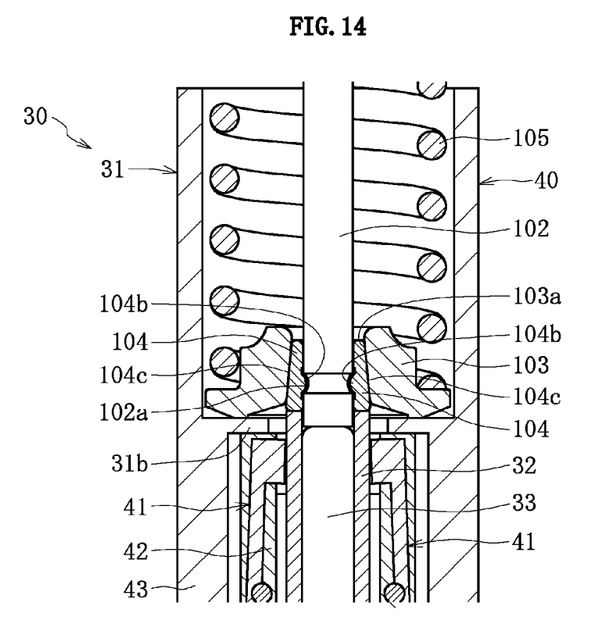
[FIG. 14] A sectional view illustrating the assembling method (just before assembly of the retainer and the cotters is completed).
Figure 15:
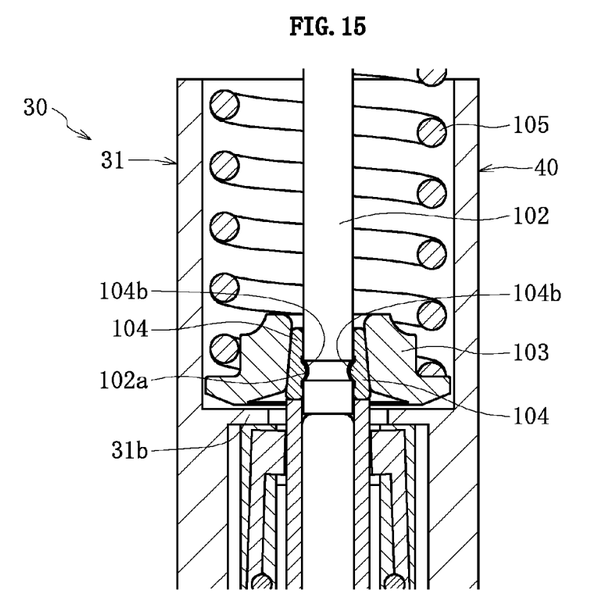
[FIG. 15] A sectional view illustrating the assembling method (at the completion of assembly of the retainer and the cotters).
Figure 16:
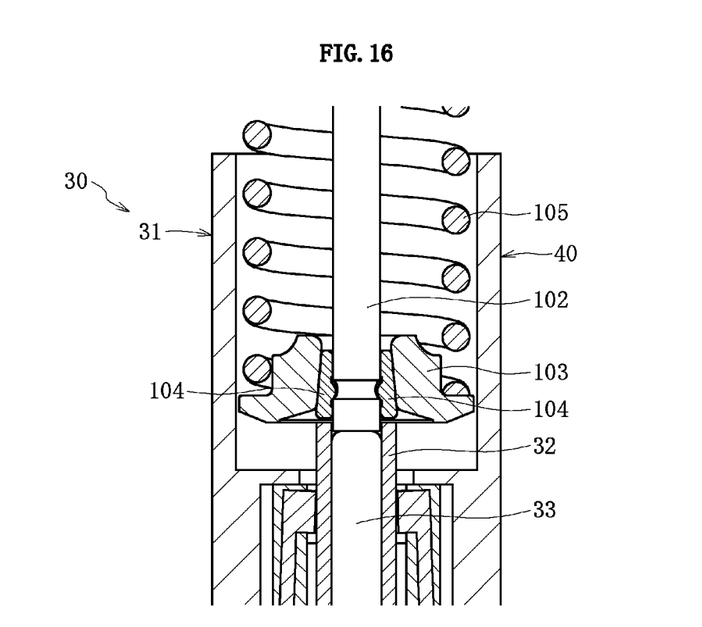
[FIG. 16] A sectional view illustrating the assembling method (when a drive cylinder is at the maximum retracted position).
Figure 17:
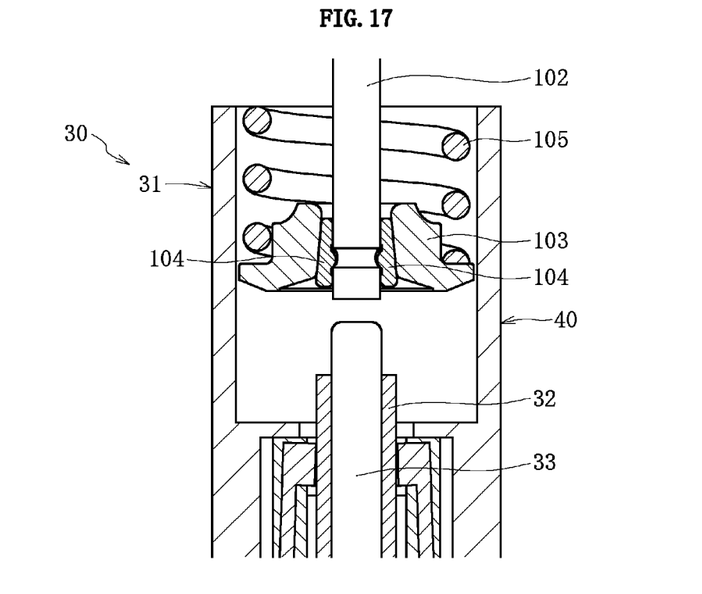
[FIG. 17] A sectional view illustrating the assembling method (at the time of detachment of the workpieces).

When the lifting sleeve 40 is further lowered, the tapered inner peripheral surface 103a of the retainer 103 is completely taper-fitted onto the tapered outer peripheral surfaces 104c of the cotters 104 (see FIG. 14). At this time, the lower end portion of the retainer 103 and the locking portion 31b of the lifting sleeve 40 (retainer holder 31) are held in contact with each other, and hence the lifting sleeve 40 (locking portion 31b) bears the biasing force of the valve spring 105. When the lifting sleeve 40 is slightly lowered from this state, the retainer 103 and the locking portion 31b are separated from each other (see FIG. 15), and simultaneously, the protrusions 104b of the cotters 104 and the annular groove 102a of the valve stem 102 are engaged with each other in the axial direction. As a result, the retainer 103 and the cotters 104 bear the biasing force of the valve spring 105 entirely. Thus, when the state illustrated in FIG. 14 is shifted to the state illustrated in FIG. 15, due to a fitting gap formed between the protrusions 104b of the cotters 104 and the annular groove 102a of the valve stem 102, the cotters 104 are slightly lowered. This suddenly applies the strong biasing force of the valve spring 105 to the cotter holder 32 which only supports the cotters 104 from below until then. At this time, as described above, owing to provision of the elongated guide hole 32c in the lower end portion of the cotter holder 32, the cotter holder 32 is allowed to slightly move in an up-down direction, and hence the cotter holder 32 is allowed to move away downward. Thus, it is possible to avoid a fear in that the cotter holder 32 is damaged by the biasing force of the valve spring 105.

As described above, it is possible to mount the retainer 103 and the cotters 104 to each of the valve stems 102. The drive cylinder 11 is retracted to the maximum extent (see FIGS. 16 and 3), and then, the cylinder heads 100 and the valves 101 are lifted up by the first moving means. As a result, the workpieces after the completion of assembly are detached from the assembling device 1 (see FIGS. 17 and 4).

By the way, in an operation (cotter assembly preparation operation) performed from the initial state illustrated in FIG. 1 until the state at the start of cotter assembly illustrated in FIG. 2 (and FIG. 9), and in an operation (cotter assembly operation) performed from the state at the start of cotter assembly illustrated in FIG. 2 until the state at the completion of cotter assembly illustrated in FIG. 3, lowering methods for the movable bench 23 are different. When providing a drive mechanism for each of the cotter assembly preparation operation and the cotter assembly operation or a drive control for each of the operations in order to realize two kinds of lowering methods for the movable bench 23, the device is complicated, which may lead to cost increase. In this context, when the first springs 22 are arranged between the first movable bench 21 and the second movable bench 23 as described above (see FIG. 1), the cotter assembly preparation operation can be performed through compression of the first springs 22 along with the lowering of the cylinder heads 100 and the assembling sections 30, whereas the cotter assembly operation can be performed through retraction of the drive cylinder 11. Thus, it is unnecessary to provide the drive mechanism or the drive control for the cotter assembly preparation operation, and hence it is possible to perform the cotter assembly preparation operation and the cotter assembly operation with the single drive cylinder 11 and the single drive control.

The embodiment of the present invention is not limited to the above-mentioned one. For example, in the above description, the description is made of the case where the assembling device 1 and the workpieces are lifted up and down in the vertical direction. However, as long as the cotters 104 can be supported stably, the assembling device 1 may be lifted up and down while being inclined.

Further, in the above description, as illustrated in FIGS. 11 to 17, the locking portion 31b of the lifting sleeve 40 and the upper end portion 42b of the lever support portion 42 are brought into contact with each other so that the locking portion 31b pushes the lever support portion 42 down. However, the present invention is not limited thereto, and it is only necessary that the lifting sleeve 40 and the lever support portion 42 be engaged with each other in the axial direction. For example, though illustration is omitted, the following structure may be adopted. Specifically, the lever support portion 42 is provided with a flange portion protruding from the outer peripheral surface of the lever support portion 42, and the flange portion and the lifting sleeve 40 are engaged with each other in the axial direction so that the lifting sleeve 40 pushes the flange portion (lever support portion) down.

Further, the workpieces, the lifting sleeve, and the lever support portion may be lifted up and down relative to one another with movement similar to the above-mentioned one. Anyone of the members may be moved, or some or all of the members may be moved.

REFERENCE SIGNS LIST 1 retainer-and-cotter assembling device
10 stationary frame
11 drive cylinder
21 first movable bench
22 first spring
23 second movable bench
30 assembling section
31 retainer holder
32 cotter holder
33 guide pin
34 cotter pressing mechanism
35 fixing portion
36 abutting portion
37 second spring
38 third spring
39 fourth spring
40 lifting sleeve
41 sandwiching lever (sandwiching member)
42 lever support portion
43 opening/closing member
100 cylinder head
101 valve
102 valve stem (shaft member)
103 retainer
104 cotter
105 valve spring

The invention claimed is:

1. A retainer-and-cotter assembling device for assembling a shaft member, a cotter, and a retainer together,
the shaft member including a recess formed in an outer peripheral surface,
the cotter including a protrusion which is formed on an inner peripheral surface and engaged with the recess of the shaft member in an axial direction, the cotter having a tapered outer peripheral surface gradually expanded in diameter to one side in the axial direction, the cotter being divided into a plurality of pieces in a circumferential direction,
the retainer having a tapered inner peripheral surface fitted onto the tapered outer peripheral surface of the cotter,
the retainer-and-cotter assembling device comprising:
a cotter holder for supporting a large-diameter-side end surface of the cotter from below;
first moving means for inserting the shaft member along an inner periphery of the cotter from above the cotter;
a cotter pressing mechanism for pressing the cotter from an outer periphery of the cotter and for fitting the protrusion on the inner peripheral surface of the cotter into the recess in the outer peripheral surface of the shaft member; and
second moving means for taper-fitting the inner peripheral surface of the retainer onto the outer peripheral surface of the cotter from above the cotter.

2. A retainer-and-cotter assembling device according to claim 1, wherein the cotter pressing mechanism comprises a pair of sandwiching members for sandwiching the cotter, and an opening/closing member provided with a cam surface for opening/closing the pair of sandwiching members, and wherein the opening/closing member is moved by the second moving means relative to the pair of sandwiching members so that the pair of sandwiching members are allowed to be opened/closed.

3. A retainer-and-cotter assembling device according to claim 1, further comprising a guide pin that is allowed to be inserted along the inner periphery of the cotter and to be moved downward due to a pressing force applied by the shaft member from above.

4. A retainer-and-cotter assembling device for assembling a shaft member, a cotter, and a retainer together, the shaft member including a recess formed in an outer peripheral surface, the cotter including a protrusion which is formed on an inner peripheral surface and is configured to engage the recess of the shaft member in an axial direction, the cotter having a tapered outer peripheral surface gradually expanded in diameter to one side in the axial direction, and the retainer having a tapered inner peripheral surface configured to fit onto the tapered outer peripheral surface of the cotter, the retainer-and-cotter assembling device comprising:
a cotter holder configured to support a large-diameter-side end surface of the cotter from below;
a cotter pressing mechanism configured to press the cotter from an outer periphery of the cotter and allow the shaft member to be inserted into an inner periphery of the cotter from above the cotter such that the protrusion on the inner peripheral surface of the cotter fits into the recess in the outer peripheral surface of the shaft member; and
a drive cylinder configured to taper-fit the inner peripheral surface of the retainer onto the outer peripheral surface of the cotter from above the cotter.

5. The retainer-and-cotter assembling device of claim 4, wherein the cotter pressing mechanism comprises a pair of sandwiching members for sandwiching the cotter, and an opening/closing member provided with a cam surface for opening/closing the pair of sandwiching members, and wherein the opening/closing member is movable by the drive cylinder relative to the pair of sandwiching members and configured such that the pair of sandwiching members are opened/closed as the opening/closing member moves.

6. The retainer-and-cotter assembling device of claim 4, further comprising a guide pin configured to be inserted along the inner periphery of the cotter and moved downward due to a pressing force applied by the shaft member from above.

7. The retainer-and-cotter assembling device of claim 4, wherein the cotter holder is configured to support a cotter which includes a small-diameter-side end surface opposite to the large-diameter-side end surface, and wherein the cotter holder is configured to support the cotter from below with the large- diameter-side end surface of the cotter being closest to the cotter holder.

8. The retainer-and-cotter assembling device of claim 4, wherein the cotter holder is configured to hold a cotter which is divided into a plurality of pieces in a circumferential direction.

9. A retainer-and-cotter assembling method of assembling a cotter and a retainer to a shaft member, the cotter having a tapered outer peripheral surface gradually expanded in diameter to one side in an axial direction, the retainer having a tapered inner peripheral surface fitted onto the tapered outer peripheral surface of the cotter, the method comprising:
inserting the shaft member in an inner periphery of the cotter from above the cotter while a large-diameter-side end surface of the cotter is supported from below;
fitting a recess formed in an outer peripheral surface of the shaft member and a protrusion formed on an inner peripheral surface of the cotter to each other by pressing the cotter from an outer periphery of the cotter; and
fitting the tapered inner peripheral surface of the retainer onto the tapered outer peripheral surface of the cotter from above.

10. The method of claim 9, wherein the retainer and the cotter are assembled to the shaft member under a state in which a spring is arranged on the retainer in advance.

11. The method of claim 10, wherein the retainer and the cotter are assembled to the shaft member under a state in which a spring sheet is arranged further on the spring.

12. The method of claim 9, wherein the cotter includes a small-diameter-side end surface opposite to the large-diameter-side end surface, and wherein said inserting the shaft member operation is performed while a cotter holder supports the cotter from below and the large-diameter-side end surface of the cotter is closest to the cotter holder.

13. The method of claim 9, wherein said inserting the shaft member operation is performed while establishing a correspondence between an axial position of the recess formed in an outer peripheral surface of the shaft member and an axial position of the protrusion formed on an inner peripheral surface of the cotter.

14. The method of claim 9, wherein the cotter is divided into a plurality of pieces in a circumferential direction.

* * * * *